R. F. GAYLORD.
Erasive Tablet.
No. 230,700. Patented Aug. 3, 1880.
fig. 1.
fig. 3. fig. 2.
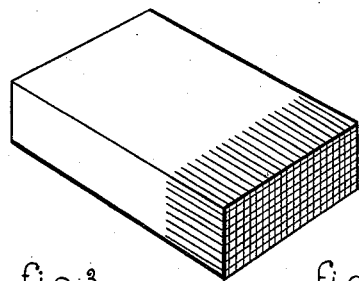
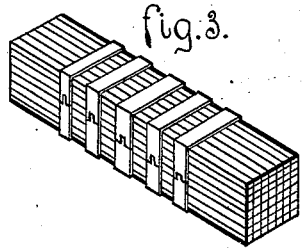
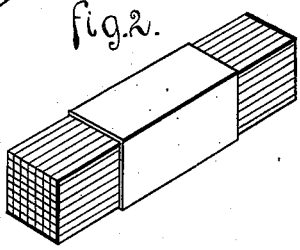
fig. 4.
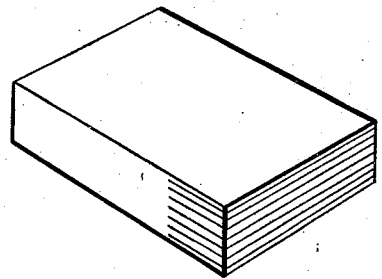
Witnesses:
A. D. Smith
H. B. Freeman
Inventor:
Robt. F. Gaylord

UNITED STATES PATENT OFFICE.

ROBERT F. GAYLORD, OF HARTFORD, CONNECTICUT.

ERASIVE TABLET.

SPECIFICATION forming part of Letters Patent No. 230,700, dated August 3, 1880.

Application filed December 6, 1879.

*To all whom it may concern:*

Be it known that I, ROBERT F. GAYLORD, of Hartford, in the county of Hartford and State of Connecticut, have invented a certain new and useful Improvement in Erasive Tablets, of which the following, taken in connection with the accompanying figures of drawing, is a specification.

Figure 1 is a view of an erasive tablet embodying my invention. Figs. 2, 3, and 4 are views of modifications.

The invention consists in an erasive tablet of india-rubber (meaning by india-rubber either the pure gum or those compounds of which india-rubber forms the substantial part, and which are of the degrees of hardness adapted to erasive purposes) divided in one or more directions, and the sides of the divisions in contact, all as more particularly described hereinafter.

Fig. 1 represents such a tablet when the divisions and the base which supports them are integral. Fig. 2 represents a modification thereof, wherein the division is carried from end to end of the tablet and the middle part of the tablet is supported by a band or cincture. Fig. 3 represents a modification thereof, wherein the division is carried from end to end of the tablet and the middle part of the tablet is supported by a series of small bands or cinctures, which may be successively removed as the tablet shortens by wear. Fig. 4 represents a modification thereof, where, as in Fig. 1, the divisions and the base are integral, but the lines of division run in one direction only.

The divisions of the tablet are such as are suited to the purpose in hand. They are so fine that they will readily bend or sway under a pressure sufficient to give erasive action. They are so coarse that they will not, like a mere mass of fringe, entirely give way under such a pressure. This description of the size of the divisions is what is meant by "divided as described," as used in the claim at the end of this specification.

The sides of the divisions are in contact— *i.e.*, not separated like the bristles of a brush— to give mutual support and co-operative action.

The working ends of the divisions become bluntly pointed by use, and I find it advantageous to give them this shape at first.

I claim as my invention—

An erasive tablet of india-rubber, divided, as described, in one or more directions, and the sides of the divisions in contact.

ROBERT F. GAYLORD.

Witnesses:
WM. E. SIMONDS,
A. N. BRAGG.